US008075801B2

(12) United States Patent
Jones

(10) Patent No.: US 8,075,801 B2
(45) Date of Patent: Dec. 13, 2011

(54) PHOTOLUMINESCENT (PL) APPLICATIONS ON MOVEABLE EQUIPMENT

(75) Inventor: Joseph Bachir Jones, Newport, NC (US)

(73) Assignee: Defense Holdings, Inc., Manassas, VA (US)

( * ) Notice: Subject to any disclaimer, the term of this patent is extended or adjusted under 35 U.S.C. 154(b) by 1334 days.

(21) Appl. No.: 11/411,858

(22) Filed: Apr. 27, 2006

(65) Prior Publication Data

US 2007/0051923 A1 Mar. 8, 2007

Related U.S. Application Data

(60) Provisional application No. 60/675,865, filed on Apr. 29, 2005.

(51) Int. Cl.
*C09K 11/08* (2006.01)

(52) U.S. Cl. ............ 252/301.4 R; 252/301.36; 428/690; 428/40.1; 428/41.6; 428/41.7; 428/434; 428/325; 428/323; 427/157

(58) Field of Classification Search ............. 252/301.36, 252/301.4 R; 427/157; 428/690, 40.1, 41.6, 428/41.7, 343, 325, 323
See application file for complete search history.

(56) References Cited

U.S. PATENT DOCUMENTS

| | | | | |
|---|---|---|---|---|
| 2,310,740 | A * | 2/1943 | Leavy | 250/488.1 |
| 2,382,355 | A * | 8/1945 | Warren, Jr. | 250/462.1 |
| 2,436,182 | A * | 2/1948 | Schmidling | 250/488.1 |
| 2,950,222 | A * | 8/1960 | Hinson | 156/67 |
| 4,998,391 | A | 3/1991 | Connew | |
| 5,415,911 | A * | 5/1995 | Zampa et al. | 428/41.8 |
| 5,424,006 | A * | 6/1995 | Murayama et al. | 252/301.4 R |
| 6,071,432 | A * | 6/2000 | Yocom et al. | 252/301.4 S |
| 6,073,375 | A * | 6/2000 | Fant et al. | 40/594 |
| 6,089,299 | A * | 7/2000 | Ead et al. | 156/579 |
| 6,177,029 | B1 * | 1/2001 | Kaz et al. | 252/301.33 |
| 6,207,077 | B1 * | 3/2001 | Burnell-Jones | 252/301.36 |
| 6,251,491 | B1 * | 6/2001 | Kim | 428/40.1 |
| 6,253,698 | B1 * | 7/2001 | Goedel | 114/218 |
| 6,307,207 | B1 | 10/2001 | Burbank | |
| 6,696,126 | B1 * | 2/2004 | Fischer et al. | 428/40.2 |
| 2003/0122107 | A1 * | 7/2003 | Pourdeyhimi et al. | 252/301.36 |
| 2003/0159250 | A1 * | 8/2003 | Ruana | 16/431 |
| 2003/0222247 | A1 * | 12/2003 | Putman et al. | 252/301.36 |
| 2004/0021407 | A1 * | 2/2004 | Baillie et al. | 313/111 |
| 2004/0135122 | A1 | 7/2004 | Hyland, Jr. et al. | |
| 2005/0034648 | A1 * | 2/2005 | Goedel | 114/343 |
| 2005/0048263 | A1 | 3/2005 | Ford et al. | |
| 2005/0052880 | A1 * | 3/2005 | Buckingham et al. | 362/471 |
| 2006/0014031 | A1 * | 1/2006 | Ohkoshi et al. | 428/457 |
| 2006/0046093 | A1 * | 3/2006 | Landry et al. | 428/690 |

FOREIGN PATENT DOCUMENTS

WO WO 2004/044065 * 5/2004

* cited by examiner

*Primary Examiner* — Carol M Koslow
(74) *Attorney, Agent, or Firm* — Oblon, Spivak, McClelland, Maier & Neustadt, L.L.P.

(57) ABSTRACT

The present invention provides methods and systems for moveable pieces of equipment comprising a passively charged photoluminescent material to improve visibility of the equipment in low light conditions. This moveable piece of equipment may be a piece of ground support equipment such as that used in support of an operation. Further, these operations may include, for example, nautical operations (e.g., Naval operations or ocean-going cargo transportation), construction of a structure (e.g., building construction), aviation (i.e., flight) operations (e.g., in support of an airport), transportation of goods (e.g., via rail or truck), drilling operations (e.g., drilling for oil, water, gas or explosives), mining operations, oil processing (refinery) operations etc.

34 Claims, 7 Drawing Sheets

PHOTOLUMINESCENT (PL) APPLICATIONS ON MOVEABLE EQUIPMENT

CROSS-REFERENCE TO RELATED APPLICATIONS

This application claims the benefit of U.S. provisional application No. 60/675,865, filed Apr. 29, 2005, which is incorporated herein by reference in its entirety. This application also makes reference to the following co-pending U.S. Patent Applications. The first application is U.S. application Ser. No. 11/440,097, entitled "PHOTOLUMINESCENT (PL) WEAPON SIGHT ILLUMINATOR," filed on May 25, 2006. The second application is U.S. application Ser. No. 10/623,186, entitled "METHOD OF ILLUMINATING A ROTARY BLADE BY APPLICATION OF A PHOTOLUMINESCENT PAINT," issued on Feb. 5, 2008. The entire disclosure and contents of the above applications are hereby incorporated by reference.

BACKGROUND

1. Field of the Invention

The present invention relates generally to photoluminescence, and more particularly, to photoluminescent applications to moveable equipment.

2. Related Art

Ground support personnel, potentially distracted by high tempo operations, are often injured, and are sometimes killed when working with or around support equipment, especially during night and low light level operations as well as during times of low visibility. This problem is not limited to a specific industry. Accidents occur every year throughout the country with any military or commercial operation. Three types of warning signals have generally been used to enhance awareness of support equipment: audible warning signal, electronic warning signals, and visual warning signals.

Given the fact that most maintenance and operational personnel working in high-noise environments wear hearing protection because of noise, audible warnings are not practical solutions. Electronic signaling devices, worn by personnel working in the proximity of support equipment and activated by a low-range signal emitted by the operation of said equipment are seemingly attractive options. However, such electronic signaling devices have their own drawbacks, such as: complexity, reliability, electromagnetic interference (EMI), high cost and maintenance burdens, etc.

As such, there is a need for better methods and systems for improving the situational awareness (SA) of persons in the vicinity of support equipment during darkened or low-light conditions so as to minimize the risk of injury or damage to persons and/or equipment.

SUMMARY

According to a first broad aspect of the present invention, there is provided an article, comprising a moveable piece of equipment for use in supporting an operation, wherein the moveable piece of equipment comprises a passively charged photoluminescent material to improve visibility of the equipment in low light conditions.

According to a second broad aspect of the invention, there is provided a method to improve visibility in low light conditions of a piece of moveable equipment, the method comprising applying a passively charged photoluminescent material to a moveable piece of equipment, the moveable piece of equipment for use in support of an operation.

BRIEF DESCRIPTION OF THE DRAWINGS

The invention will be described in conjunction with the accompanying drawings, in which.

DETAILED DESCRIPTION

Figure 1:
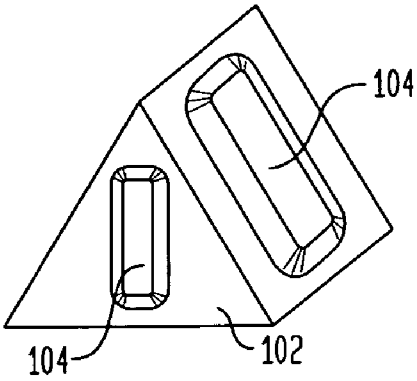
FIG. 1 illustrates an exemplary piece of moveable equipment, in accordance with one embodiment of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "ground support equipment" refers to any moveable piece of equipment for use in supporting an operation. Examples of ground support equipment include: wheel chocks, turnbuckles, chains, come-alongs, tugs, tow bars, work stands, cranes, power carts, starting units (e.g., for starting an air craft's turbine engine, such as, Huffers) firefighting equipment, ordinance stands for carrying weapons, tractors, trucks, ladders, scaffolding, air compressors, air & electrical extension cords, jacks, creepers, etc.

For the purpose of the present invention, the term "operation" refers to any commercial and/or military action, campaign, mission, task, or job. Examples of operations include: nautical operations (e.g., Naval operations or ocean-going cargo transportation), construction of a structure (e.g., building construction), aviation (i.e., flight) operations (e.g., in support of an airport), transportation of goods (e.g., via rail or truck), drilling operations (e.g., drilling for oil, water, gas or explosives), mining operations, oil processing (refinery) operations etc.

For the purpose of the present invention, the term "passively charged" refers to the charging of non-radioactive photoluminescent materials by exposure to natural or artificial light sources. An example of passively charging a photoluminescent material using natural or artificial light is described below.

For the purposes of the present invention, the term "photoluminescent material" refers to any item exhibiting photoluminescent characteristics. Examples of photoluminescent materials include paint, film, and powder coatings For the purposes of the present invention, the term "photoluminescent characteristics" refers to an items ability to absorb light and later emit light, such as for example, during low light or darkened conditions.

For the purposes of the present invention, the term "photoluminescent paint" refers to any paint exhibiting photoluminescent characteristics. Examples of photoluminescent paint include paints comprising a phosphor, such as a strontium aluminate phosphor.

For the purposes of the present invention, the term "photoluminescent film" refers to thin coating, covering, membrane, sheet, etc. exhibiting photoluminescent characteristics. Examples of photoluminescent film include films comprising a phosphor, such as a strontium aluminate phosphor.

For the purposes of the present invention, the term "photoluminescent powder coating" refers to a powder coating exhibiting photoluminescent characteristics. Examples of photoluminescent powder coatings include powder coatings comprising a phosphor, such as a strontium aluminate phosphor.

For the purposes of the present invention, the term "cast mold" or injection mold" refers to a method or item manufactured by placing a material into a mold and allowing it to cure thus resulting in an item in a desired shape. Exemplary materials that may be placed in the mold include, for example, acrylics or urethanes, such as for example, urethane comprising a photoluminescent. Exemplary shapes include wheel chocks, turnbuckles, letters, numbers, etc.

Description

Reference will now be made in detail to the present embodiments of the invention, examples of which are illustrated in the accompanying drawings. Wherever possible, the same reference numbers will be used throughout the drawings to refer to the same or like parts.

An aspect of the present invention is directed to Photoluminescent (PL) applications to ground support equipment. This application of photoluminescent materials to ground support equipment provides a mechanism to visually identify potentially hazardous ground support equipment at night or during periods of low light and thus improve safety for those in the area.

The below described PL applications may be applied to ground support equipment that, for example, is either located in a dark location or a location during which there are periods of poor visibility. Further, these locations may include locations in which there are large, heavy and/or dangerous moving or movable objects that must be avoided by personnel working in the vicinity during the darkness or periods of poor visibility. Examples of ground support equipment include: supporting an operation. Examples of ground support equipment include: wheel chocks, turnbuckles, chains, come-alongs, tugs, tow bars, work stands, cranes, power carts, starting units (e.g., for starting an air craft's turbine engine, such as, Huffers) firefighting equipment, ordinance stands for carrying weapons, tractors, trucks, ladders, scaffolding, air compressors, air & electrical extension cords, jacks, creepers, etc. Exemplary operations include: nautical operations (e.g., Naval operations or ocean-going cargo transportation), construction of a structure (e.g., building construction), aviation (i.e., flight) operations (e.g., in support of an airport), transportation of goods (e.g., via rail or truck), drilling operations (e.g., drilling for oil, water, gas or explosives), mining operations, oil processing (refinery) operations etc.

In one embodiment, the photoluminescent material applied to the ground support equipment may be a passively charged Low Light Level Illuminator (LLLI) photoluminescent material. In one embodiment, the photoluminescent material is a material comprising Strontium Aluminate (referred to herein as "SrAl") based materials. SrAl is a combination of Strontium, Aluminum, and Oxygen. For example, in an embodiment the photoluminescent material comprises $SrAl_2O_4$ phosphor crystals Further, in an embodiment, the $SrAl_2O_4$ crystals are doped with rare earth elements, such as, for example, lanthanides (e.g., Europium). Europium doped $SrAl_2O_4$ emits a green light with a wavelength of approximately 520 nm. In another embodiment, the photoluminescent material may be an alumina silicate based material. These materials are but some exemplary phosphors that may be used in accordance with the invention and any other currently know or later developed photoluminescent material may be used without departing from the invention.

As is known to those of skill in the art, the basic principle behind photoluminescence is as follows: electrons orbiting the phosphor atoms or molecules absorb energy through collision with photons during excitation. The excitation source is electromagnetic radiation (primarily UV)—absorbed from visible and invisible light. When the excitation source is extinguished, phosphorescent materials release the stored energy in the form of visible light. It is this light, called afterglow, which we perceive as a self-luminous source. The afterglow decreases over time, exhibiting a hyperbolic decay. The duration and the intensity of the afterglow is a function of several variables including: type of phosphor; intensity of the activation source; type of activation source; and duration of activation exposure. LLLI photoluminescent materials have several advantages over warning systems for support equipment. These advantages include: they can be applied easily, they do not require an external power source (i.e., they are a passive system), its not a hazardous (e.g., non-radioactive), they are reusable and sustainable technology, they are durable and relatively maintenance-free, they have high reliability (i.e. that have utility even when damaged), they are technology that is readily available, they are relatively cheap to use, and they may be easily and quickly used to replace or improve existing warning systems for support equipment.

As will be discussed in more detail below, the photoluminescent material may applied to the ground support equipment using a variety of means, such as, for example, by using paint, adhesives, or a powder-coating application. Furthermore, the photoluminescent material may in certain implementations incorporate, for example, a non-skid texture for safety and/or glass beads for reflectivity. Furthermore, implementations, such as adhesive applications, may included be a combination photoluminescent material and reflective material in one.

FIG. 1 illustrates an exemplary piece of moveable equipment, in accordance with one embodiment of the invention. As illustrated, in this example equipment 102 is a wheel chock to which a photoluminescent adhesive film system 104 has been applied. This photoluminescent adhesive film system 104 may be applied in a variety of ways without departing from the scope of the invention. An exemplary method for application of photoluminescent adhesive film system 104 will be discussed in more detail below. Although photoluminescent adhesive film system 104 is illustrated as a rectangle, other geometries may be used without departing from the invention. For example, photoluminescent film system 104 may be applied to an entire side (or all sides) of the ground support equipment. Or, for example, photoluminescent adhesive film system 104 may be in the shape of circle, triangle, cross, letter, or number. Or, for example, photoluminescent adhesive film system 104 may be in the shape of a symbol that, for example, identifies the type of ground support equipment 102 (e.g., in the shape of runway tug).

Figure 2:
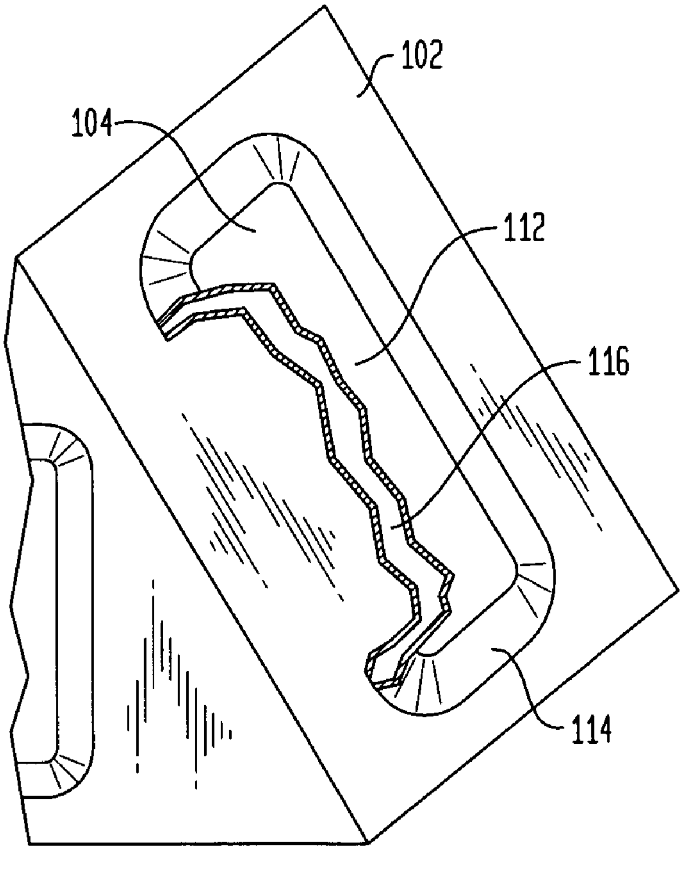
FIG. 2 illustrates a close-up cross sectional view of a photoluminescent adhesive film system, in accordance with one embodiment of the present invention.

FIG. 2 illustrates a close-up cross sectional view of photoluminescent adhesive film system 104. As illustrated, photoluminescent adhesive film system 104 includes three parts: a photoluminescent film 112, an edge sealer 114 and an adhesive film 116.

The photoluminescent film of the present invention may be any type of photoluminescent film, such as, for example, a photoluminescent nylon resin-based film co-extruded with a white reflective backing and a fluoropolymer film co-extruded with a white reflective backing. In one embodiment, the photoluminescent film of the present invention may be 6-22 mils thick, more preferably approximately 12-14 mils thick to help provide superior wear resistance. Both the nylon resin based film and the fluoropolymer film offer the advantages of uniform thickness, repeatability and ease of application. A nylon photoluminescent film may provide exceptional erosion resistance and, as such, may be preferable in outdoor environments where the ground support equipment is exposed to rain and sun and/or saltwater. A fluoropolymer material is however, more pliable, and as such more easily adheres to non-flat surfaces or surfaces that move, such as those of a turnbuckle. As such, a fluoropolymer material may be more desirable in these environments.

An adhesive film of the present invention may used to apply the photoluminescent films onto the equipment (e.g., wheel chock 102 of FIGS. 1 and 2). Any type of adhesive film, such as those commercially available may be used for adhering a photoluminescent film to a piece of ground support equipment without departing from the invention. For example, the adhesive film may be a high performance pressure sensitive thin double-sided adhesive film such as, for example, the 747 or 7325 adhesive films available from Adchem Corp. or the 9469 or 9500PC films available from 3M, Inc. In some embodiments, the adhesive film is able to cold flow between the photoluminescent film and the ground support equipment during curing to thereby create a high-strength permanent bond. In one embodiment, the adhesive film is preferably an approximately 2-5 mil thick, high initial tack, soft acrylic permanent pressure sensitive film that adheres to a large variety of substrates and laminates. As is known to those of skill in the art, high initial tack refers to adhesives that, when applied, they stick immediately to the surface to which they are applied.

Edge sealer 114 may be any type edge sealer such as, for example, the Scotch-Weld 2216 B/A and Scotch-Weld 3532 B/A edge sealers commercially available from 3M Corporation. In some embodiments, edge sealer 114 exhibits resistance to environmental conditions including humidity and salt spray as well as resistance to a number of industrial solvents, lubricating oils and fuels. It should be appreciated that the above-identified adhesives and edge sealers are exemplary, and other adhesives and edge sealers are considered within the scope of the invention.

Figure 3:
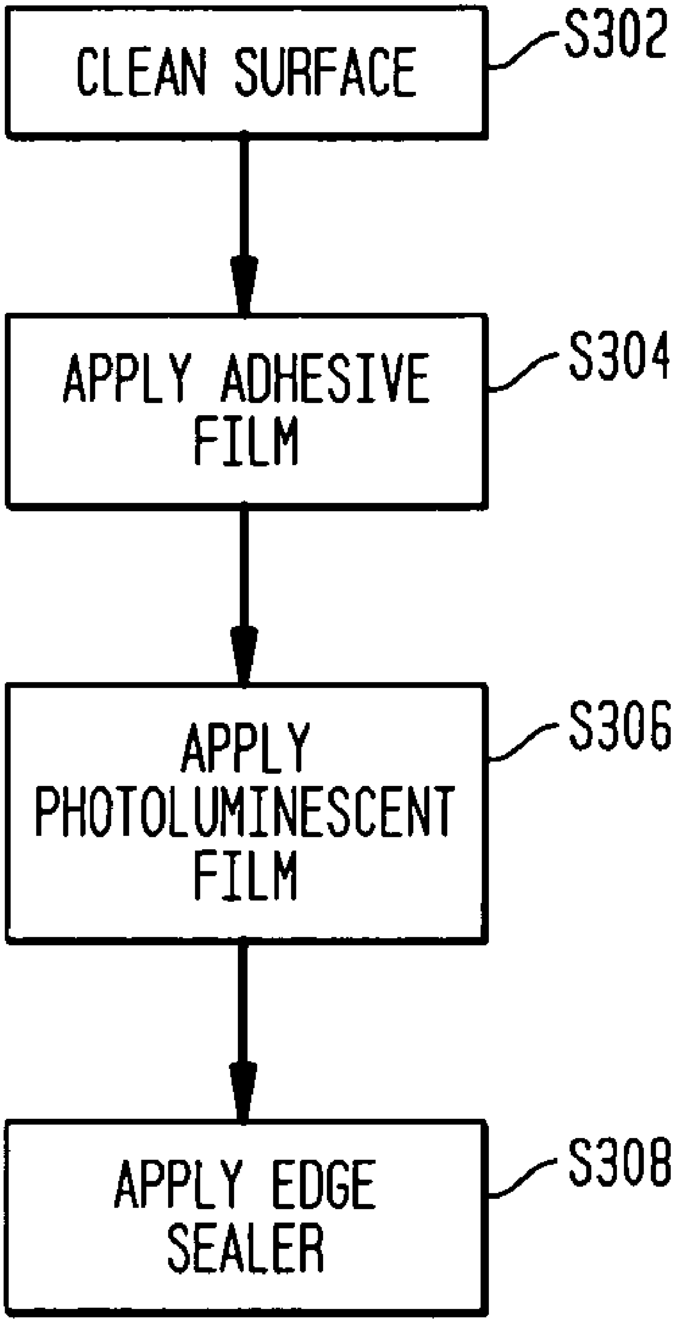
FIG. 3 illustrates an exemplary method for application of a photoluminescent adhesive film system to equipment, in accordance with one embodiment of the present invention.

FIG. 3 illustrates an exemplary method for application of the photoluminescent adhesive film system 104 of FIG. 2. First, ground support equipment 102 is cleaned (S302). This may be accomplished using an alcohol-based solution by wiping down the area with a clean rag, applying the solvent, and re-wiping. Next, adhesive film 116 is applied in the desired area (S304). If adhesive film 116 is a dual-sided adhesive film (i.e., adhesive on both sides), then prior to application, adhesive film 116 has a release paper on both sides to protect the adhesive. As such, adhesive film 116 may be applied by pealing off the release paper from one side of the adhesive film 116 and sticking the now exposed adhesive to the surface of ground support equipment 102 using hand pressure. After which, photoluminescent film 112 is applied to adhesive film 116 (S306). This may be accomplished, for example, by peeling off the release paper from the second side of adhesive film 116 and sticking photoluminescent film 112 to the now exposed adhesive. Then, if desired, edge sealer 114 is applied over photoluminescent film 112 (S308). This may be accomplished, for example, by brushing edge sealer 114 on photoluminescent film 112 and adhesive film 116 and allowing edge sealer 114 to dry. However, in typical applications an edge sealer need not be used.

In an alternative embodiment, rather than applying multiple layers such as discussed above with reference to FIG. 3, in another embodiment photoluminescent adhesive film system may be a peel and stick adhesive. For example, the photoluminescent adhesive film system may initially be manufactured with the photoluminescent film and the adhesive film already combined with a release paper covering the adhesive on the opposite side of the photoluminescent film Then, to apply the photoluminescent adhesive film system, the release paper is peeled off to expose the adhesive film and the photoluminescent adhesive film system is applied to the ground support equipment by sticking the photoluminescent adhesive film system to the ground support equipment. After application of the photoluminescent adhesive film system, an edge sealer may be applied.

It should be noted that although an edge sealer is applied in the above-described embodiments, an edge sealer is optional and in other embodiments need not be used. It should also be noted that these are but exemplary methods for applying a photoluminescent film and other methods and systems may be used without departing from the invention.

Figure 4:
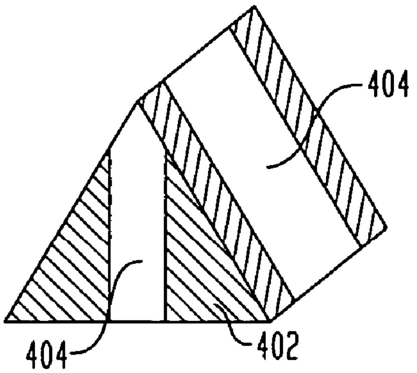
FIG. 4 illustrates an exemplary piece of moveable equipment, in accordance with one embodiment of the present invention.

FIG. 4 illustrates an exemplary piece of moveable equipment, in accordance with one embodiment of the present invention. As illustrated, in this example, ground support equipment 402 is a wheel chock that has been painted with a photoluminescent paint system 404.

Photoluminescent paint system 404 may be applied in a variety of ways without departing from the scope of the invention and exemplary methods for application will be discussed in more detail below. Also, although photoluminescent paint system 404 of FIG. 4 is a rectangle, other geometries may be used without departing from the invention. For example, the photoluminescent paint system may be applied to an entire side (or all sides) of the ground support equipment. Or, for example, photoluminescent paint system may be in the shape of circle, triangle, cross, letter, or number. Or, for example, the photoluminescent paint system may be in the shape of a symbol that, for example, identifies the type of ground support equipment (e.g., in the shape of tug).

Figure 5:
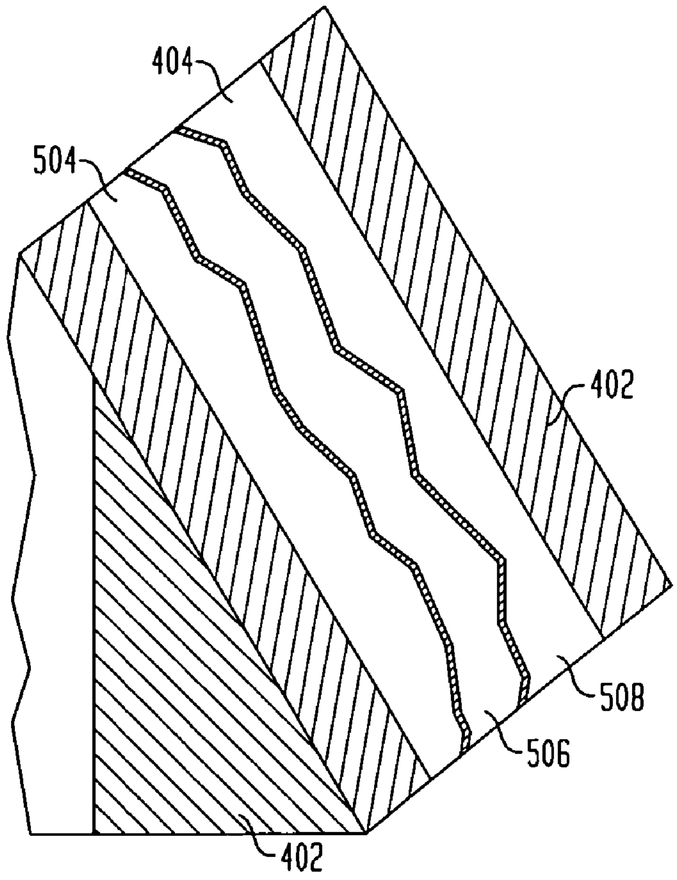
FIG. 5 illustrates a close-up cross sectional view of photoluminescent paint system, in accordance with one embodiment of the present invention.

FIG. 5 illustrates a close-up cross sectional view of photoluminescent paint system 404. As illustrated, photoluminescent paint system 404 comprises three parts: a white paint 504; photoluminescent paint 506; and an optional sealer 508, applied to ground support equipment 402. These paints may be, for example, two-part urethane paints; however, other types of paints may be used (e.g., acrylic or lacquer paints) depending, for example, on the equipment and environment in which it will be used. White paint 504 is preferably a white reflective base coat type paint that is applied to a thickness of approximately 4.0-5.5 mils. Photoluminescent paint 506, which is described in more detail below, is preferably applied to a thickness of 12.5-13.0 mils. Sealer 508, when used, provides a clear protective topcoat and is preferably applied to a thickness of 1.9-2.5 mils.

In an embodiment, photoluminescent paint 504 uses a polyester resin as a carrier and is loaded with SrAl phosphor crystals that occupy interspatial sites in the resin polymer structure. Depending on the specific properties desired for photoluminescent paint 506, the specific composition of the paint may be varied. For example, the concentration of SrAl crystals in the resin polymer carrier and/or the size of the SrAl crystals may be varied to achieve different results. In general, increasing the concentration of SrAl crystals, their size, or both results in both increased luminance performance and increased texture (i.e., a rougher texture) of the resulting photoluminescent paint. However, it also generally increases costs. Additionally various additives may be added to the composition to achieve different results, such as to accelerate cure time, enhance durability, maximize clarity, improve pigment suspension, increase anti-sag characteristics, increase solvent resistance, and modify the flexibility of the resulting paint. For example, in an embodiment, Europium doped $SrAl_2O_4$ may be used for providing photoluminescent characteristics to photoluminescent paint 506.

It should be noted that the thicknesses of the three layers of the present discussed photoluminescent system are exemplary and may be modified depending on the specific properties desired for the photoluminescent system. For example if greater luminance performance is desired, the photoluminescent paint may be applied more thickly. Or, if less luminance performance is desired, the photoluminescent paint may be applied more thinly. Likewise, if greater protection against solvents, erosion, etc. is desired, a clear protective topcoat sealer may be applied more thickly. Or alternatively, clear protective topcoat sealer need not be used in other implementations.

Figure 6:
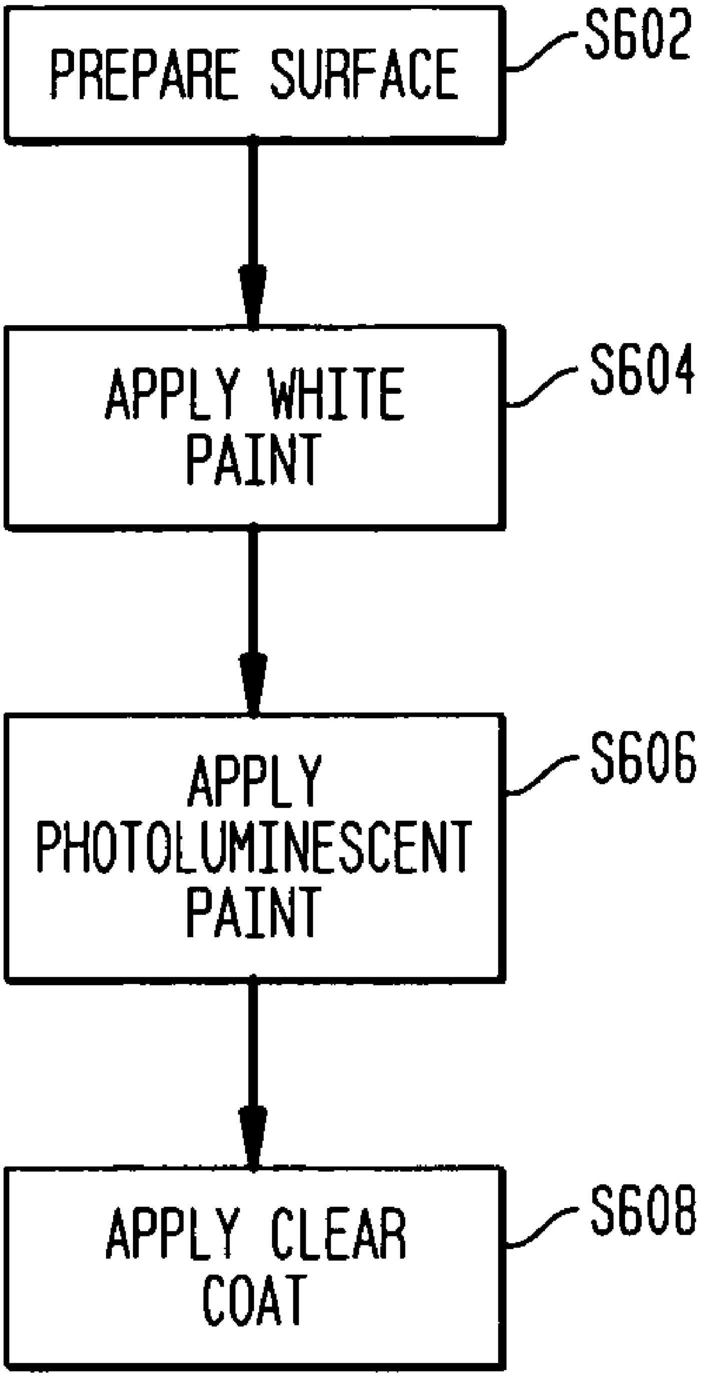
FIG. 6 illustrates an exemplary method for application of a photoluminescent paint system to equipment, in accordance with one embodiment of the present invention.

FIG. 6 illustrates an exemplary method for application of a photoluminescent paint system to ground support equipment, in accordance with an aspect of the invention. First, the surface of the ground support equipment that will be painted is prepared (S602). This surface preparation may comprise creating a 1-2 mil surface profile through the use of a mild abrasive followed by a solvent wipe. Next, a white paint 504 is applied (S604). As noted above, paint 504 may be a white reflective base coat type paint. This paint, as with all other paint layers may be applied with brush, roller, or spray methods. When applying with a spray gun, paint 504 may be mixed with a reducer, for example in a 3:1 paint to reducer ratio.

After paint 504 dries, photoluminescent paint 506 is applied on top of white paint 504 (S606). If applied via a spray gun, photoluminescent paint 506 may be mixed with a reducer in a 3:1 paint to reducer ratio. Photoluminescent paint 504 then is allowed to dry. A sealer or clear coat may also be applied (S608).

The above description provides exemplary methods and systems for imparting photoluminescent characteristics to a piece of equipment, and other methods and systems may be used without departing from the invention. For example, in other embodiments a photoluminescent application may be used similar to those described in U.S. patent application Ser. No. 10/623,186 to Thomas Martin Buckingham entitled "Low Light Level Illumination," which is hereby incorporated by reference herein in its entirety. Further, the thicknesses of the various materials discussed above in terms of mils are exemplary only and other thicknesses may be used without departing from the invention.

In another embodiment, rather than applying a white paint and a photoluminescent paint by painting, one or more of these layers may be replaced by a powder coat. As is known to those of skill in the art, powder coating is a dry finishing process, using finely ground particles of pigment and resin, which are electrostatically charged and sprayed onto a part to be coated. The charged particles adhere to the parts until melted and fused into a tough, even coating through the application of heat and energy. As such, in an embodiment in which the photoluminescent layer is applied by powder coating, SrAl particles may be used in the powder coating process in place of the pigment.

In yet another embodiment, a cast mold or injection molding technique may be used. For example, a urethane or acylic material comprising photoluminescent phosphor crystals (e.g., SrAl particles) may be mixed and placed into a mold where it is allowed to cure. In such an example, the mold may be, for example, in the shape of a wheel chock or part of a turnbuckle. Thus, when removed from the mold, the resulting item (e.g., a wheel chock, part of a turnbuckle, etc.) will accordingly have photoluminescent characteristics. In other words, such a cast mold or injection molded technique may be used to manufacture a piece of ground support equipment (e.g., a wheel chock, turnbuckle, etc.) with photoluminescent characteristics. In one example, a polyester urethane or acrylic loaded with Europium doped SrAl2O4 particles is used in this exemplary cast mold or injection molded technique to create the desired item. In other examples, a cast or injection mold technique, such as presently described, may be used to manufacture a shape (e.g., a letter, number, figure, etc.) with photoluminescent characteristics that may then be adhered to a piece of ground equipment using, for example, a two-sided adhesive film, such as described above. It should be noted that these are but exemplary cast mold or injection molded techniques for forming items with photoluminescent characteristics, and other techniques and materials may be used without departing from the invention.

As noted above, the ground support equipment to which the photoluminescent characteristics are provided is for use in support of an operation, such as, for example, nautical operations (e.g., Naval operations or ocean-going cargo transportation), construction of a structure (e.g., building construction), aviation (i.e., flight) operations (e.g., in support of an airport), transportation of goods (e.g., via rail or truck), drilling operations (e.g., drilling for oil, water, gas or explosives), mining operations, oil processing (refinery) operations etc.

Exemplary nautical operations include both marine transportation and naval operations. For example, exemplary ground support equipment provided with photoluminescent materials in accordance with the present invention may include equipment used on the deck of a naval ship, such as an aircraft carrier.

Figure 7:
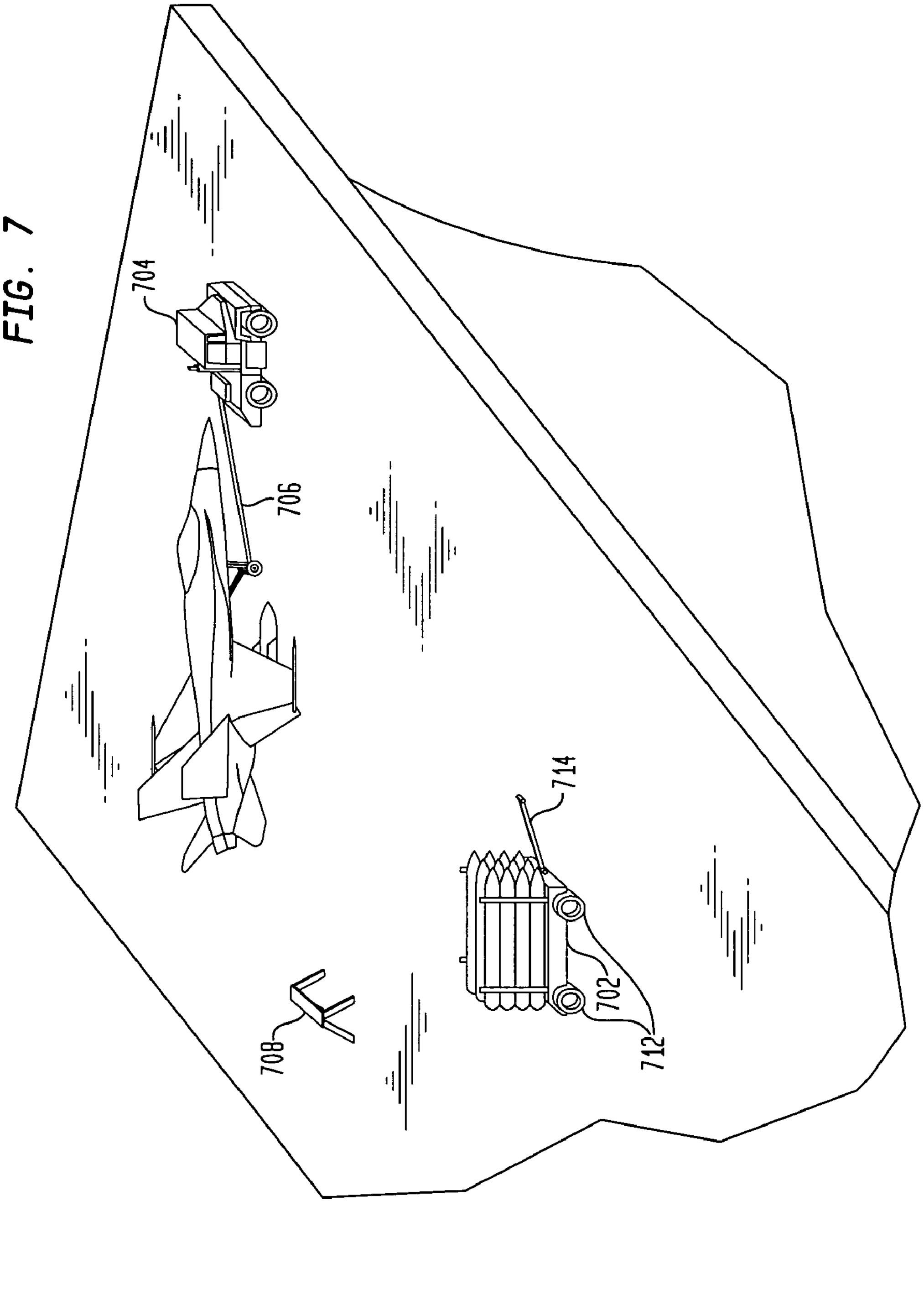
FIG. 7 illustrates an exemplary deck of an aircraft carrier including ground support equipment to which photoluminescent materials have been applied, in accordance with one embodiment of the present invention.

FIG. 7 illustrates an exemplary deck of an aircraft carrier including ground support equipment to which photoluminescent materials have been applied, in accordance with an aspect of the invention. As illustrated, photoluminescent materials have been applied to the wheels 712 and handle 714 of a pull cart 702, a runway tug 704, a tow bar 706, and a work stand 708 to enhance the equipment's visibility at night, and provide those working with or in the vicinity of the equipment better Situational Awareness (SA).

In addition to treatment of ground support equipment on naval vessels, ground support equipment provided with photoluminescent characteristics such as those described herein may also be used in the support of maritime transportation operations. For example, in embodiments of the present invention, ground support equipment used on the deck of a barge or other marine vessel may be provided with photoluminescent characteristics to improve their visibility in low light conditions. Or, for example, ground support equipment used in the loading or unloading of goods (e.g., to/from the marine vessel (e.g., a barge, container ship, etc.) may be provided with photoluminescent materials in accordance with embodiments of the present invention.

Figure 8:
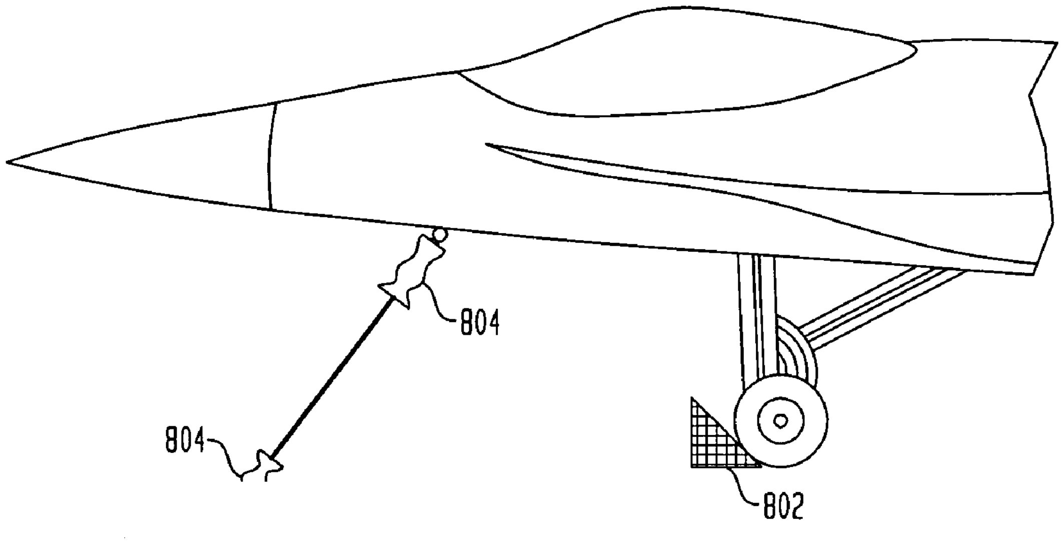
FIG. 8 illustrates an exemplary airfield including ground support equipment to which photoluminescent materials have been applied, in accordance with one embodiment of the present invention.

In addition to nautical operations, embodiments of the present invention may also be used in the support of flight operations, such as for example, on a runway, in a hangar, etc. FIG. 8 illustrates an exemplary airfield including ground support equipment to which photoluminescent materials have been applied, in accordance with an aspect of the invention. As illustrated, photoluminescent materials have been applied to wheel chocks 802 and turnbuckles 804 to enhance the equipment's visibility at night.

Embodiments of the present invention may also be used in support of the transportation of goods, such as, for example, railway, truck, or airship transportation operations. For example, photoluminescent materials may be applied to moveable equipment such as that commonly used in a rail yard for repair of locomotives, boxcars, etc., or, for example, equipment used in the loading or unloading of goods to/from railway cars. Or, for example, moveable equipment used to support trucking operations (i.e., the transportation of goods via ground) may be provided with photoluminescent materials, in accordance with embodiments of the invention. Exemplary types of such equipment may include cranes, fork lifts, pallets, wheel chocks, etc.

Further, embodiments of the present invention may also be used to provide photoluminescent characteristics to moveable equipment used in the construction industry. In such example, ground support equipment provided with photoluminescent characteristics may include, for example, cranes, tractors, work stands, ladders, etc.

EXAMPLE

Figure 9:
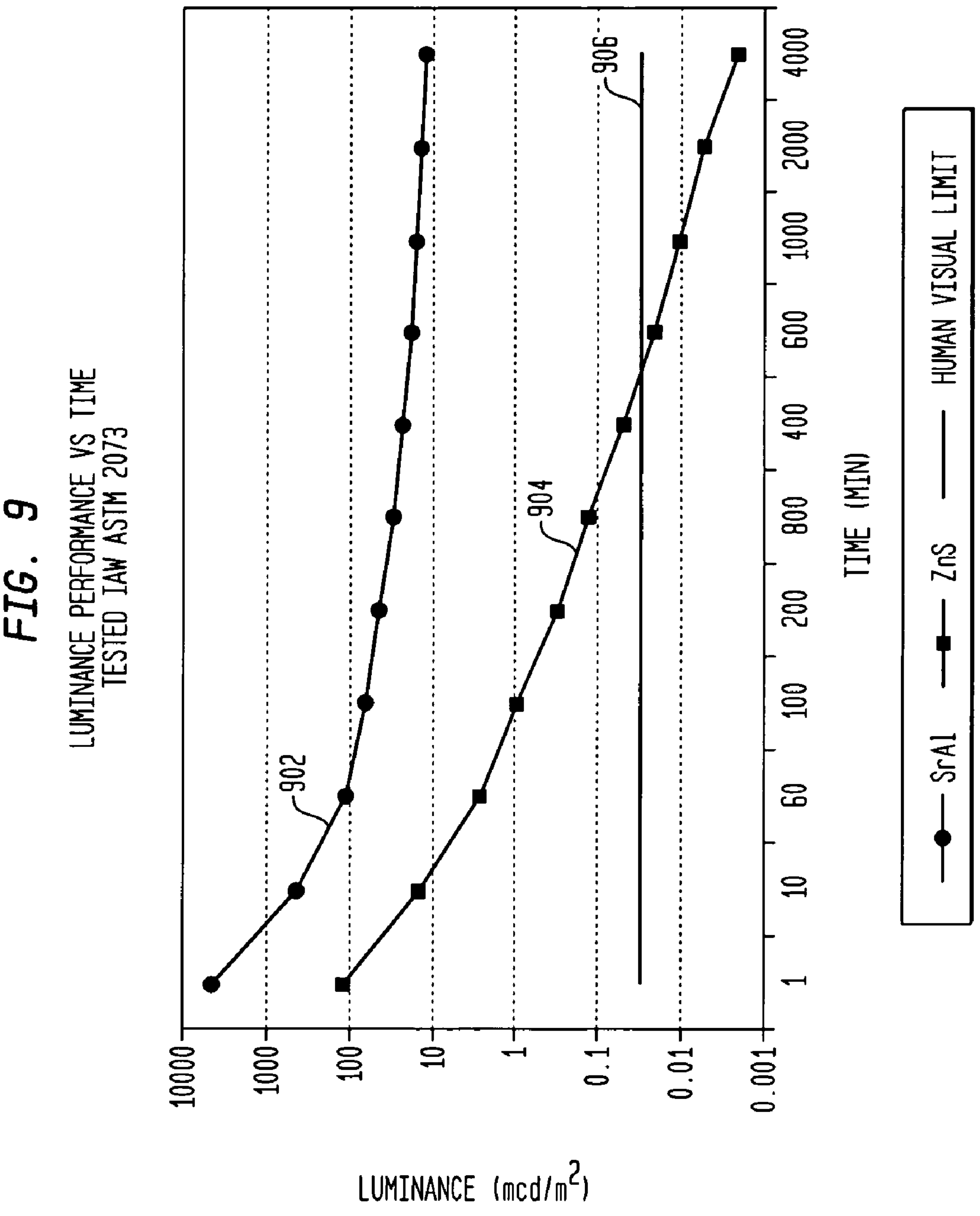
FIG. 9 illustrates an exemplary chart illustrating the luminance performance of an exemplary SrAl material in comparison to an exemplary zinc sulfide material, in accordance with an aspect of the invention.

FIG. 9 illustrates an exemplary chart illustrating the luminance performance of an exemplary SrAl material in comparison to an exemplary zinc sulfide material. As illustrated, after being fully charged, the SrAl material's curve 902 is above the minimum luminance level for human visibility 906 (0.05 millicandela per square meter (mcd/m2)) for over 4000 minutes (>60 hours). Further, the luminance for this exemplary SrAl material remains at a level of over 1 mcd/m2 over a period of 4000 minutes. In contrast, the zinc sulfide material's curve 904 illustrates that its luminance is only above the illustrated human visual limit for a period of approximately 500 minutes (8 hours). Further, as shown the zinc sulfide drops below a level of 1 mcd/m2 in approximately 100 minutes (less than 1.5 hours). As such, this exemplary SrAl material exhibits significantly improved luminance performance, and accordingly improved safety, over that of the zinc sulfide material. The curves 902 and 904 were generated in accordance with the American Society for Testing and Materials (ASTM) E 2073-00 standard (i.e., ASTM E 2073-00). In addition to offering nearly four times the luminance performance over zinc sulfide, the SrAl photoluminescent material offers other advantages. For example, unlike zinc sulfide type materials which can turn dark over a period of time, the SrAl material does not change color over time and has a far greater service life than that of zinc sulfide materials.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart there from.

What is claimed is:

1. A moveable piece of equipment for use in supporting a military operation, the moveable piece of equipment comprising:

a photoluminescent application to a surface of the moveable piece of equipment comprising a plurality of strontium aluminate phosphor crystals, wherein the photoluminescent application exhibits a luminance of greater than or equal to 0.05 millicandela per square meter ($mcd/m^2$) for a period of at least 4000 minutes.

2. The equipment of claim 1, wherein the moveable piece of equipment is a piece of equipment for use in a nautical environment.

3. The equipment of claim 1, wherein the moveable piece of equipment is a piece of equipment for use in supporting flight operations.

4. The equipment of claim 1, wherein the moveable piece of equipment is selected from the group consisting of a wheel chock, a turnbuckle, a chain, a come-along, a tug, a tow bar, a work stand, a crane, a power cart, a starting unit, firefighting equipment, an ordinance stand, a tractor, a truck, a ladder, scaffolding, an air compressors, an extension cords, a jacks, and a creeper.

5. The equipment of claim 1, wherein the photoluminescent application further comprises a lanthanide dopant.

6. The equipment of claim 1, wherein the photoluminescent application comprises a photoluminescent paint.

7. The equipment of claim 6, wherein the photoluminescent application further comprises a white paint, wherein the white paint is applied directly to a surface of the moveable piece of equipment and the photoluminescent paint is applied directly to the white paint.

8. The equipment of claim 6, wherein the thickness of the photoluminescent paint is between 12.5 and 13.0 mils.

9. The equipment of claim 7, wherein the photoluminescent application further comprises a sealer.

10. The equipment of claim 1, wherein the photoluminescent application comprises a photoluminescent film and an adhesive film, wherein the photoluminescent film directly and continuously contacts the adhesive film, and wherein the adhesive film is capable of adhering to a surface of the moveable piece of equipment.

11. The equipment of claim 10, wherein the photoluminescent film has a thickness between 6 and 22 mils.

12. The equipment of claim 11, wherein the photoluminescent film has a thickness between 12 and 14 mils.

13. The equipment of claim 10, wherein the photoluminescent application further comprises an edge sealer.

14. The equipment of claim 10, wherein the adhesive film is a peel and stick adhesive.

15. The equipment of claim 1, wherein the photoluminescent application comprises a photoluminescent powder coating.

16. The equipment of claim 1, wherein the photoluminescent application comprises a non-skid texture.

17. The equipment of claim 1, wherein the photoluminescent application further comprises a plurality of glass beads.

18. A method to improve visibility in low light conditions of a piece of moveable equipment used in support of an operation, the method comprising:

applying a photoluminescent material to a moveable piece of equipment, the photoluminescent material comprising a plurality of strontium aluminate phosphor crystals, wherein the photoluminescent application exhibits a luminance of greater than or equal to 0.05 millicandela per square meter (mcd/$m^2$) for a period of at least 4000 minutes.

19. The method of claim 18, wherein the moveable piece of equipment is a piece of equipment for use in a nautical environment.

20. The method of claim 18, wherein the moveable piece of equipment is a piece of equipment for use in supporting flight operations.

21. The method of claim 18, wherein the moveable piece of equipment is selected from the group consisting of a wheel chock, a turnbuckle, a chain, a come-along, a tug, a tow bar, a work stand, a crane, a power cart, a starting unit, firefighting equipment, an ordinance stand, a tractor, a truck, a ladder, scaffolding, an air compressors, an extension cords, a jacks, and a creeper.

22. The method of claim 18, wherein the photoluminescent material further comprises a lanthanide dopant.

23. The method of claim 18, wherein the photoluminescent material comprises a photoluminescent paint.

24. The method of claim 23, wherein the photoluminescent material further comprises a white paint, wherein the white paint is applied directly to a surface of the moveable piece of equipment and the photoluminescent paint is applied directly to the white paint.

25. The method of claim 23, wherein the thickness of the photoluminescent paint is between 12.5 and 13.0 mils.

26. The method of claim 24, wherein the photoluminescent material further comprises a sealer.

27. The method of claim 18, wherein the photoluminescent material comprises a photoluminescent film and an adhesive film, wherein the photoluminescent film directly and continuously contacts the adhesive film, and wherein the adhesive film is capable of adhering to a surface of the moveable piece of equipment.

28. The method of claim 27, wherein the photoluminescent film has a thickness between 6 and 22 mils.

29. The method of claim 28, wherein the photoluminescent film has a thickness between 12 and 14 mils.

30. The method of claim 27, wherein the photoluminescent material further comprises an edge sealer.

31. The method of claim 27, wherein the adhesive film is a peel and stick adhesive.

32. The method of claim 18, wherein the photoluminescent material comprises a photoluminescent powder coating.

33. The method of claim 18, wherein the photoluminescent material comprises a non-skid texture.

34. The method of claim 18, wherein the photoluminescent material further comprises a plurality of glass beads.

* * * * *